United States Patent
Kikuchi

(10) Patent No.: US 7,360,704 B2
(45) Date of Patent: Apr. 22, 2008

(54) SCAN ENGINE WITH GUIDING LIGHT BEAMS

(75) Inventor: Ikuo Kikuchi, Saitama (JP)

(73) Assignee: Optoelectronics Co., Ltd., Saitama Pref. (JP)

(*) Notice: Subject to any disclaimer, the term of this patent is extended or adjusted under 35 U.S.C. 154(b) by 297 days.

(21) Appl. No.: 11/272,855

(22) Filed: Nov. 14, 2005

(65) Prior Publication Data

US 2007/0108290 A1    May 17, 2007

(51) Int. Cl.
*G06K 7/10* (2006.01)
*G06K 19/06* (2006.01)

(52) U.S. Cl. .................... 235/462.02; 235/462.01; 235/462.41; 235/462.32

(58) Field of Classification Search .......... 235/462.02, 235/462.01, 462.45, 472.01, 462.32, 462.41
See application file for complete search history.

(56) References Cited

U.S. PATENT DOCUMENTS

| | | | |
|---|---|---|---|
| 5,381,438 A | | 1/1995 | Guo et al. |
| 5,623,137 A | * | 4/1997 | Powers et al. .......... 235/462.23 |
| 5,756,981 A | * | 5/1998 | Roustaei et al. ....... 235/462.42 |
| 5,841,121 A | * | 11/1998 | Koenck ................. 235/472.01 |
| 5,852,288 A | * | 12/1998 | Nakazawa et al. ..... 235/472.01 |

FOREIGN PATENT DOCUMENTS

| | | |
|---|---|---|
| JP | 60-65383 A | 4/1985 |
| JP | 3-25585 A | 2/1991 |
| JP | 06-123851 A | 5/1994 |
| JP | 1997-326004 A | 12/1997 |
| JP | 1998-320822 A | 12/1998 |
| JP | 1999-7490 A | 1/1999 |
| JP | 11-316794 A | 11/1999 |
| JP | 2001-308439 A | 11/2001 |
| JP | 2002-123791 A | 4/2002 |
| JP | 2003-30577 A | 1/2003 |
| JP | 2003-337941 A | 11/2003 |
| WO | WO 2003/019463 A | 3/2003 |

OTHER PUBLICATIONS

International Search Report and Written Opinion, Nov. 8, 2005.
International Search Report, Oct. 25, 2005.
Int'l Search Report & Written Opinion, Dec. 27, 2005.

* cited by examiner

*Primary Examiner*—Edwyn Labaze
(74) *Attorney, Agent, or Firm*—Kaplan Gilman Gibson & Dernier LLP

(57) ABSTRACT

A method for reading symbols having data identifying characteristics is provided. The method includes the steps of: providing a nose portion that forms part of a symbol capture device. The nose portion has a plurality of spaced apart light sources that are adapted to put images on a surface. The images can be used to ascertain proper positioning and focal plane of the device.

16 Claims, 3 Drawing Sheets

SCAN ENGINE WITH GUIDING LIGHT BEAMS

BACKGROUND OF THE INVENTION

1. Field of the Invention

The present invention generally relates to symbol capture devices, and more particularly, relates to a symbol capture device or other symbol capture device with guiding light beams for ascertaining the focal length and field of view at that focal length of an image capture device.

2. Description of the Related Art

Symbol capture devices used for reading symbols having data identifying characteristics such as barcodes are known. Typically, a symbol capture device has guiding light beams for suitable positioning including the positioning of focal length and field of view. That is to say, the symbol capture device needs to be positioned relative to the symbol located at a distance at an optimal position. Known methods to determine the optimum position include using laser light sources or light emitting diodes (LED). It is important to position the device correctly, because it operates as a CCD camera or the like, and the clarity of the image and effectiveness of reading is decreased if the position is incorrect.

FIG. 1 shows three prior art LED projection schemes on to a surface for use in positioning the surface to be read relative to the device. The drawbacks of prior art LED schemes are that the projections do not provide a clear field of view, and there is no indication of the focal plane at which the surface to be read should be positioned.

FIG. 2 is an alternative prior art arrangement using lasers. The laser provides the same visual display to a user regardless of distance between the device and the surface of the image. While it clearly shows the field of view, the cost is relatively high. Additionally, it is difficult to ascertain the focal length. It is desirable to have a system wherein the user can easily determine the proper focal length as well as the field of view of the image capture device at that focal length. The solution should have minimal cost.

SUMMARY OF THE INVENTION

The present invention generally provides a symbol capture device with guiding light beams for focal length and field of view determination.

The present invention further provides a symbol capture device with a set of light sources for both field of view and focal length adjustments.

The present invention further provides a symbol capture device with a light source comprising light emitting diodes (LED), without the cost of laser sources.

A method for reading symbols having data identifying characteristics is provided. The method includes the steps of: providing a nose portion that forms part of a symbol capture device. The nose portion has a plurality of spaced apart light sources that are adapted to cause a viewable image on a surface having an image to be captured. A plurality of images are generated on the surface. The focal length and the field of view of optically discernable from characteristics of the provided images.

A system for reading symbols having data identifying characteristics is provided. The system includes: a nose portion that forms part of a symbol capture device a plurality of spaced apart light sources is provided for the nose portion. The light sources are adapted to place images on a surface having the symbols formed thereon. A plurality of images are generated upon said surface as the result of the light source, and the images convey information sufficient to readily ascertain the focal plane and the field of view.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
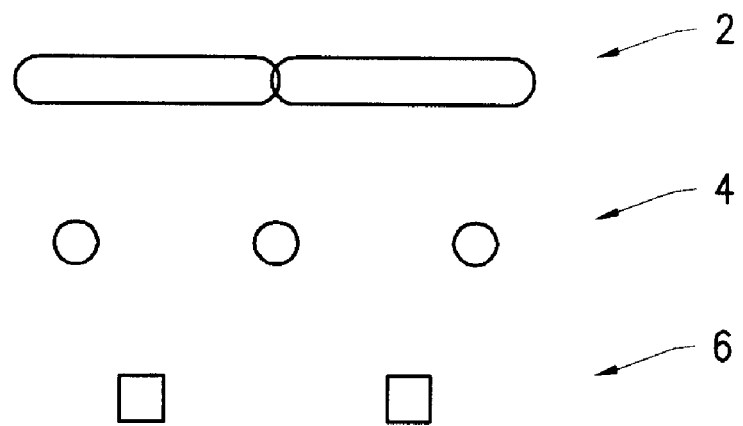
FIG. 1 depicts a set of three prior art scan projections.
Figure 2:
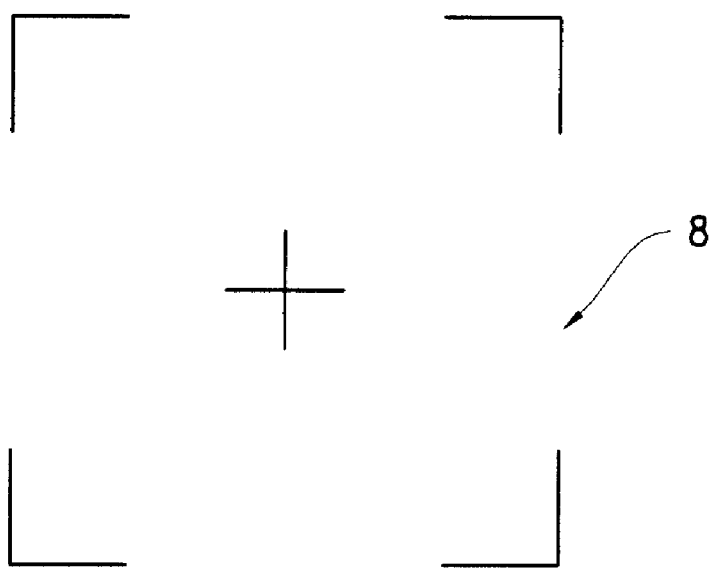
FIG. 2 depicts an alternative prior art scan projection using laser.
Figure 4:
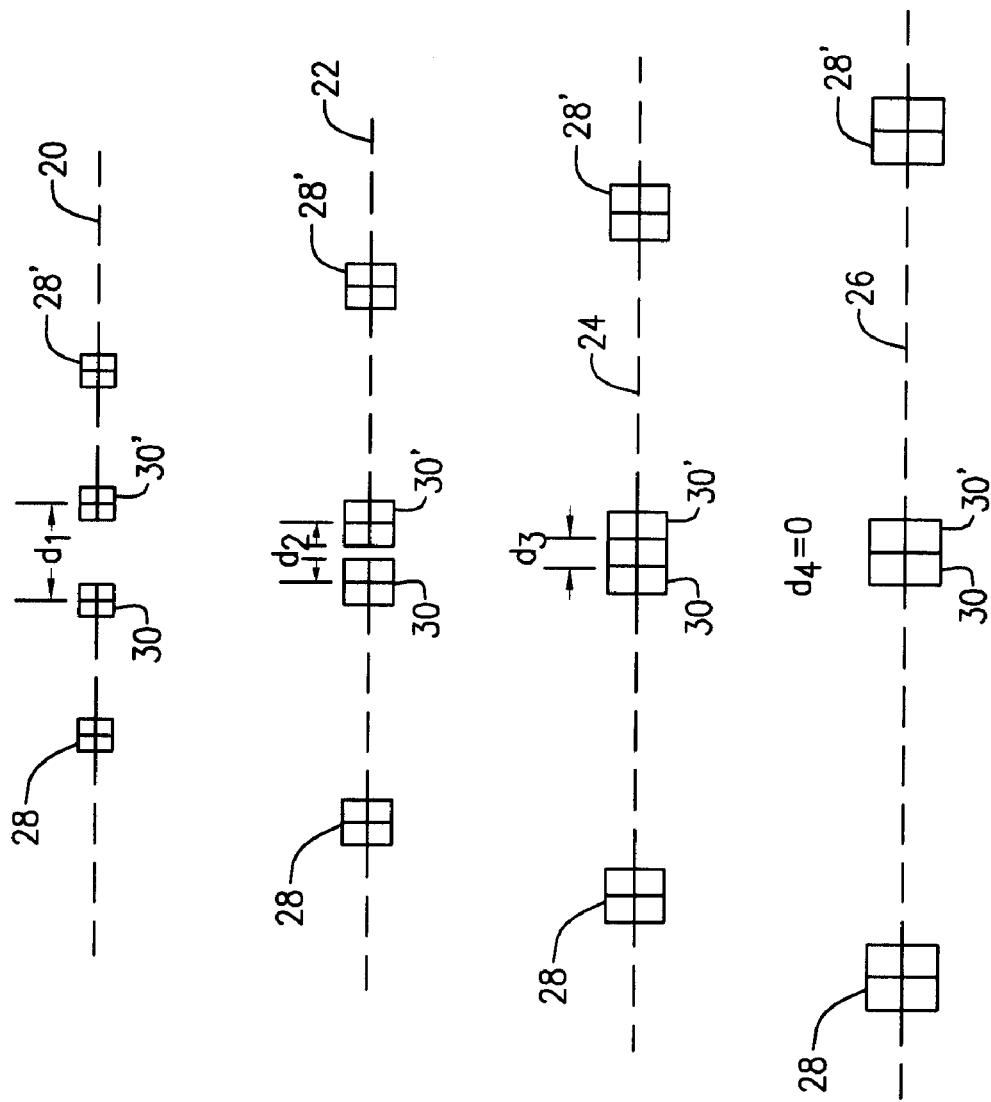
FIG. 4 is a first detailed depiction of FIG. 3.
Figure 3:
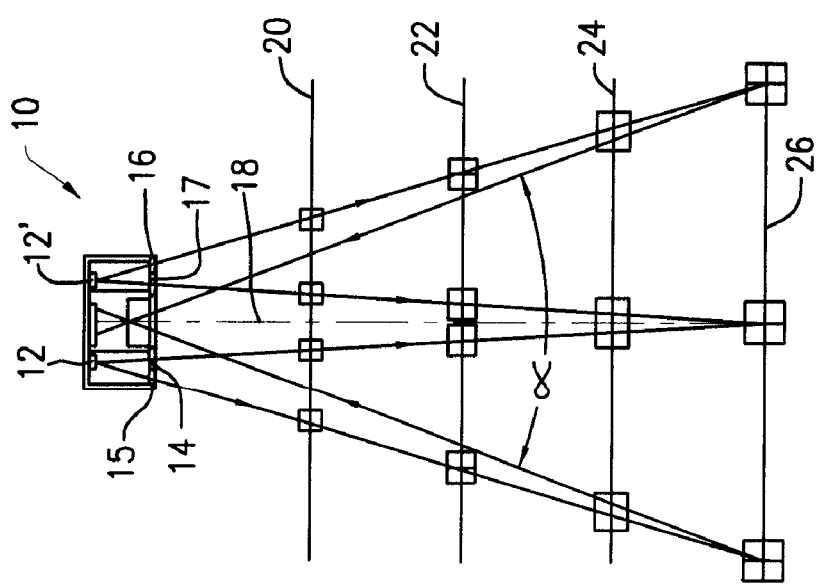
FIG. 3 depicts an optimal positioning including focal length and field of view of the present invention.
Figure 5:
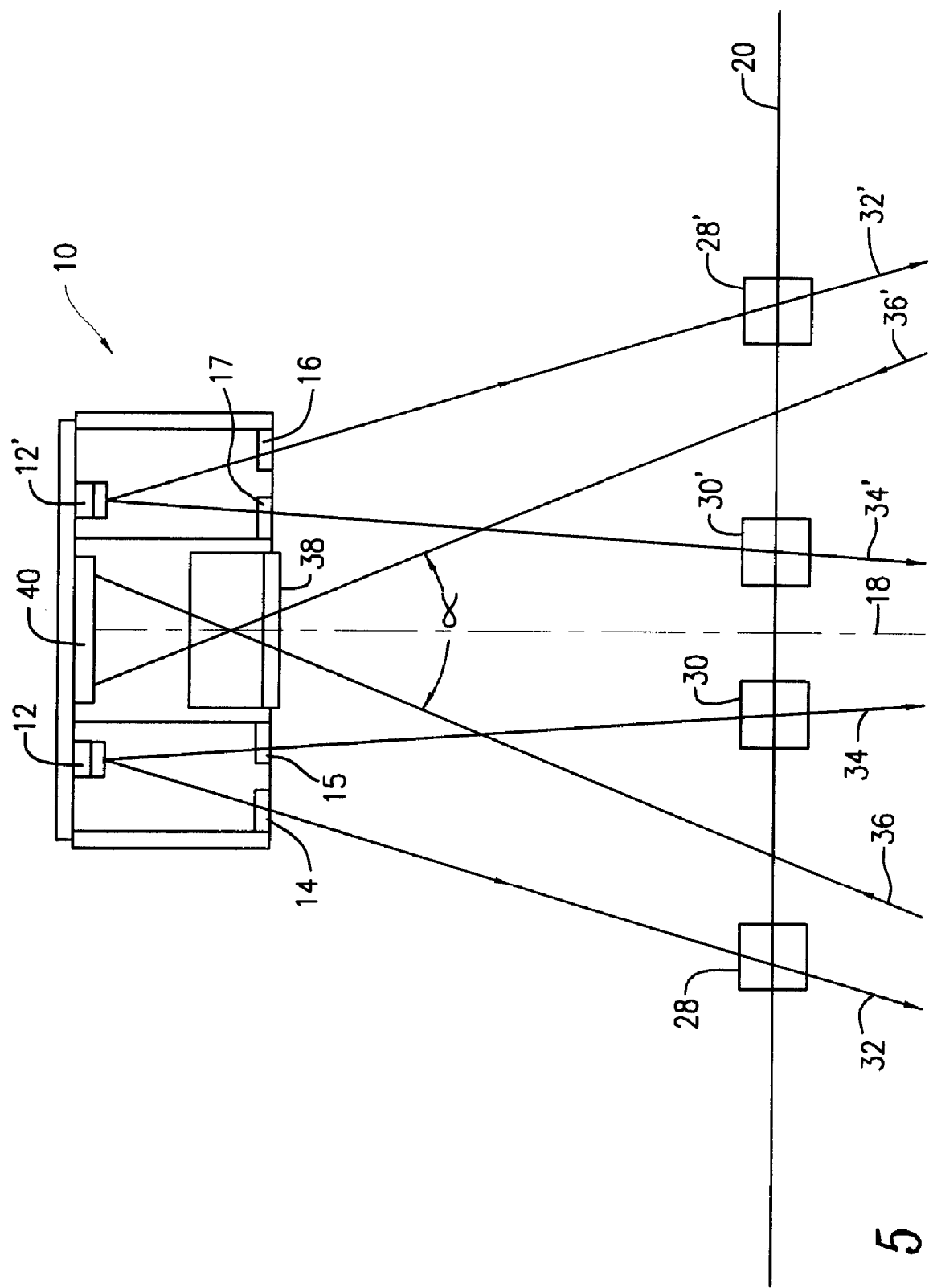
FIG. 5 is a second detailed depiction of FIG. 3.

The present invention relates to using light emitting diodes (LEDs) and their associated lenses in a scan system for defining or adjusting to an optimal focal length and a balanced field of view. Referring to FIGS. 3-5, a preferred embodiment of the present invention is described.

Referring now to FIG. 3, an optimal positioning including focal length and field of view is shown. A symbol capture device nose portion 10 having two light emitting diodes, LED 12, LED 12' that are positioned on a top surface is provided. LED 12 and LED 12' are spaced apart in that a distance having a non-zero value exists between LED 12 and LED 12'. Light generated out of LED 12 radiates through lense 14 and lens 15 to form an image on any suitable surface. Similarly, light generated out of LED 12' radiates through lense 16 and lens 17 for forming similar reflections. An imaginary assumed center axis 18 is used as a reference line. Substantially perpendicular to center axis 18 is the imaginary first surface 20. It is imaginary in that if a suitable surface is placed there, an image of the light will occur. Similarly a second surface 22, a third surface, and a fourth or optimal surface may be imagined to exist and form images thereupon. The images that would be formed on these surfaces are shown in FIG. 4, although the structure of each individual image may not be the perfect squares that are shown for explanatory purposes in FIG. 4.

As can be seen, one of the differences among first surface 20, second surface 22, third surface 24, and fourth surface or optimal reflection surface 26 is that a different distance exists between a pair center points within image 30 and image 30'. The distances are respectively $d_1$, $d_2$, $d_3$ and $d_4$ relating to first surface 20, second surface 22, third surface 24, and fourth surface or optimal reflection surface 26 respectively. As can be seen, the value of $d_1$, is greater than that of $d_2$, which is greater than that of $d_3$ and $d_4$ is zero in that the center points of image 30 and image 30' coincide ($d_1 > d_2 > d_3$ and $d_4 = 0$). The optimal focal length is known to be achieved when image 30 and image 30' are adjusted to coincide ($d_4 = 0$).

Because of the images 28 and 28', the user will know the exact field of view of the device at its optimal focal plane, and can appropriately position the surface having the images to be scanned so that the image is within the field of view defined by the images 28 and 28' and at the focal plane. In other words, the invention provides a simple method for determining both field of view and appropriate focal distance from a set of two LEDs and four lenses. The user simply places the surface to be read in front of the image capture device, and moves the surface closer to or further from the device. When images 30 and 30' completely overlap, the surface is positioned at the focal plane for optimum image capture, and the field of view at that surface is shown by the images 28 and 28'. Those of skill in the art will recognize how to choose the lenses needed to convey the proper images.

As can be seen, in the preferred embodiment two LEDs are used. Specifically, LED 12, LED 12' and four lenses 14-17 are used in conjunction with the two LEDs. An extra focusing lens 38 may or may not be provided for processing reflected light beam 36, 36' and feeding the same to a light receiver 40. Light receiver 40 converts the light signal into some other type of signals such as electric signal. Light receiver 40 may comprise charge coupled device (CCD), complementary metal oxide semiconductor sensor (CMOS), or any other suitable receiver. Two beams 36, 36' are used to define the field of view a. The two beams 32, 32' generated by different LEDs may be concentrated by two different lenses, i.e. lens 14, lens 16 respectively. Two more beams 34, 34' through different lenses 15, 17 but preferably from the different LEDs, i.e. LED 12, LED 12' are used to define focal length. Furthermore, the present invention contemplates the reading of one dimensional as well as two dimensional commonly known barcode systems, and other types of images as well.

Although the foregoing description of this invention makes reference to bar code symbol capture devices, by way of example, the invention itself is equally applicable to other methods and systems for data reading and forms of encoded data (indicia) other than bar codes.

While the foregoing is directed to embodiments of the present invention, other and further embodiments of the invention may be devised without departing from the basic scope thereof, and the scope thereof is determined by the claims that follow.

What is claimed is:

1. A method for reading symbols comprising the steps of:
   positioning a symbol capture device, having a focal plane and light source, in front of a surface, said surface having a symbol; and
   adjusting the distance between said surface and said symbol capture device such that an image caused on the surface by the light source is divided into two portions, a first portion having a predetermined characteristic when said surface is positioned at the focal plane, which characteristics visibly varies to indicate the surface is not at the focal plane, and a second portion which outlines the field of view of the symbol capture device when the surface is placed at the focal plane, and wherein the first and second portions are produced by a single light source comprising one or more light emitting elements.

2. The method of claim 1, wherein said predetermined characteristic is the number of separate images displayed.

3. The method of claim 2, wherein the number lenses is greater than the number of light sources such that at one light source uses more than one lense, and wherein at least one of the image portions is used to ascertain the field of view of the image capture device, and at least another of said image portions changes shape to visually assist a user in properly positioning a the surface with respect to the image capture device.

4. The method of claim 1, further comprising providing lenses such that there are four images when the surface is not positioned at the focal plane, and wherein at least two of the four images merge into one image when the surface is positioned at the focal plane.

5. The method of claim 1, wherein said plurality of light sources comprises at least two light emitting diodes (LEDs).

6. The method of claim 1, wherein said plurality of images comprises four images that become three when the surface is placed at the proper focal length.

7. The method of claim 1, wherein said focal length is about one hundred millimeter (100 mm).

8. The method of claim 1, wherein said symbol capture device is a hand-held symbol capture device.

9. A barcode scanning system for reading symbols having data identifying characteristics, comprising:
   a nose portion forming part of a symbol capture device having a plurality of spaced apart light sources adapted to place images on a surface having said symbols formed thereon;
   a plurality of lenses and a smaller plurality of light sources arranged such that a number of images is placed by said light sources on a surface having a symbol to be captured, and
   wherein said number of non-overlapping images changes when said surface is substantially optimally positioned for reading said symbol, and wherein when said surface is optimally positioned for reading said symbol, a field of view of said symbol capture device is designated by the same light sources causing the image to change.

10. The system of claim 9 wherein the number of non-overlapping images decreases as the surface nears the focal plane, and wherein one of a decreased number of such images begins changing shape until it reaches a prescribed shape when the surface is positioned at the focal plane.

11. The system of claim 10, wherein the number lenses is greater than the number of light sources such that at one light source uses more than one lenses.

12. The system of claim 9, further comprising the steps of:
   determining the field of view at the focal plane when said number of images changes.

13. The system of claim 9, wherein said plurality of light sources comprises at least two light emitting diodes (LEDs).

14. The system of claim 9, wherein said plurality of images decreases at the focal plane.

15. The system of claim 9, wherein said focal length is about one hundred millimeter (100 mm).

16. The system of claim 9, wherein said symbol capture device is a hand-held symbol capture device.

* * * * *